(No Model.)
L. L. HALL.
SCOOP.
No. 457,271. Patented Aug. 4, 1891.
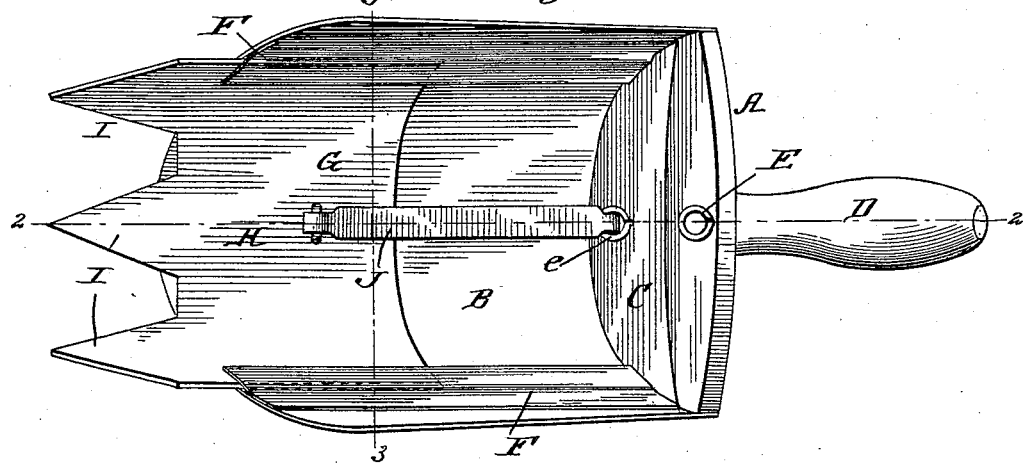
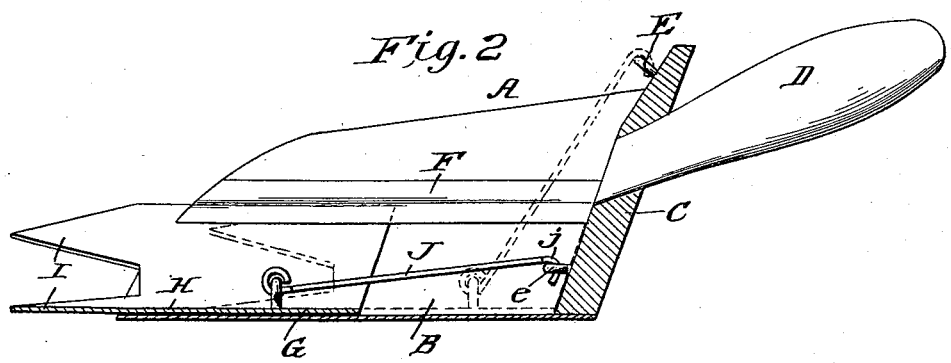
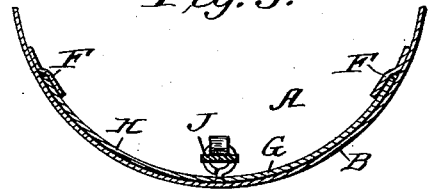
WITNESSES:
Fred J. Dieterich
P. B. Turpin
INVENTOR:
Levi L. Hall.
BY Munn & Co
ATTORNEYS

UNITED STATES PATENT OFFICE.

LEVI L. HALL, OF PARKERSBURG, WEST VIRGINIA.

SCOOP.

SPECIFICATION forming part of Letters Patent No. 457,271, dated August 4, 1891.

Application filed March 12, 1891. Serial No. 384,841. (No model.)

*To all whom it may concern:*

Be it known that I, LEVI L. HALL, of Parkersburg, in the county of Wood and State of West Virginia, have invented a new and useful Improvement in Scoops, of which the following is a specification.

My invention is an improved scoop having an adjustable or extensible digger-section; and the invention consists in certain novel constructions and combinations of parts as will be hereinafter described, and pointed out in the claims.

In the drawings, Figure 1 is a plan view of the scoop, showing the digger-section extended in position for use. Fig. 2 is a longitudinal section on about line 2 2 of Fig. 1, dotted lines being employed to show the digger-section retracted; and Fig. 3 is a cross-section of the scoop on about line 3 3 of Fig. 1.

The scoop proper A may, except in the respects hereinafter described, be of ordinary construction, having the body part B, back C, and handle D. The back C is provided, respectively, near its base and top with eyes e E. Guides F are provided on the inner surface of the body B for the digger-section, such guides being extended longitudinally on the part B and preferably made in the form of overlapping plates, beneath which the edges of the digger-section are held and slide. The digger-section G is shown as formed with a blade H and teeth I at the outer edge of such blade, the latter being held and movable longitudinally in the guides F. The blade may be extended, as shown in Figs. 1 and 2, to project the teeth I beyond the edge of the scoop, and may be held in such extended position by means of the bar or strap J, secured at one end to the digger-section and provided at its opposite end with a hook j, arranged to engage the eye or staple e when the digger is extended to hold it in such position, as shown in Figs. 1 and 2. When desired, the digger may be retracted, as indicated in dotted lines, Fig. 2, and held in such position by engaging the hook j in the eye or staple E. When the digger-section is thus adjusted, the scoop may be used as usual. By releasing the hook j the digger-section and its attached bar J may, if desired, be slipped entirely out of the scoop-body and the scoop and digger be thoroughly cleaned and washed.

When the digger is extended and secured, as shown in Figs. 1 and 2, the device may be used to break up hard lumpy sugar, soda, dried fruits, and the like, so that they can be readily dipped up by the scoop, the connection of the digger with the scoop being a great convenience, as it avoids the necessity of using a separate device for breaking up the article. Again, by the digger the material may be pulverized and broken up into small lumps and be easier to handle and less likely to tear the paper sacks in which the material is wrapped.

Having thus described my invention, what I claim as new is—

1. The combination, with a scoop, of an extensible digger-section held to and sliding longitudinally thereon and composed of a body portion or blade and teeth at the free end thereof, the said teeth being arranged to project beyond the end of the scoop in the extended position of the section, and devices whereby the said section may be held in either its extended or retracted position, substantially as set forth.

2. A scoop provided with an eye or staple e, a digger-section movable in guides in said scoop, and a strap or bar connected at one end to the digger-section and adapted at its other end to engage the eye e, substantially as shown and described.

3. The improved scoop herein described, having its body part provided with guides F and its back provided with eyes or staples e E, the digger having its blade held and movable in the guides F, and the bar or strap connected at one end with the digger and provided at its other end with a hook arranged to engage the eyes e E, whereby to hold the digger in extended or retracted position, substantially as set forth.

LEVI L. HALL.

Witnesses:
C. C. MARTIN,
E. L. NASH.